M. JENSCO.
ANTISLIPPING TREAD ATTACHMENT FOR MOTOR VEHICLES.
APPLICATION FILED NOV. 13, 1908.
941,993.
Patented Nov. 30, 1909.
2 SHEETS—SHEET 1.
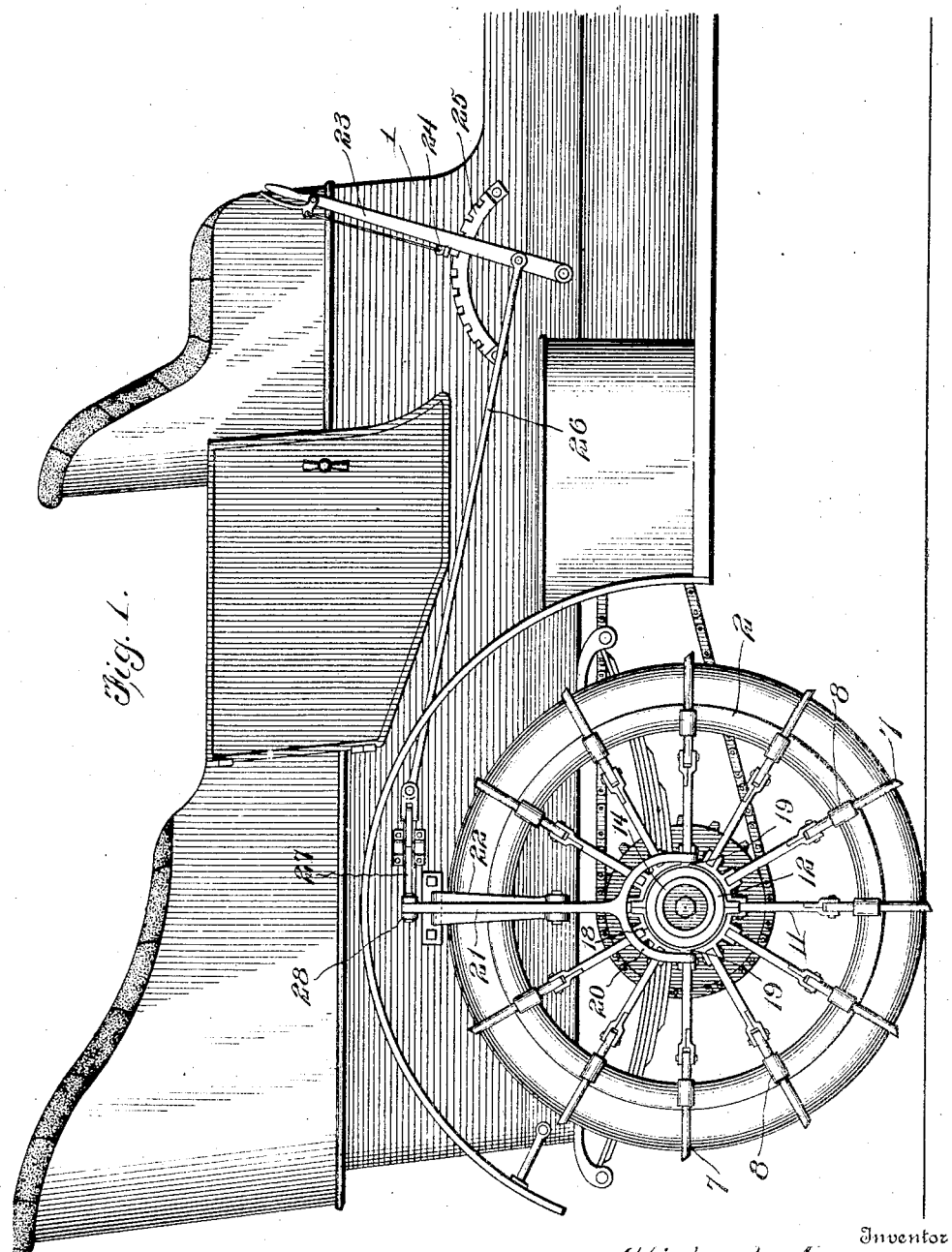

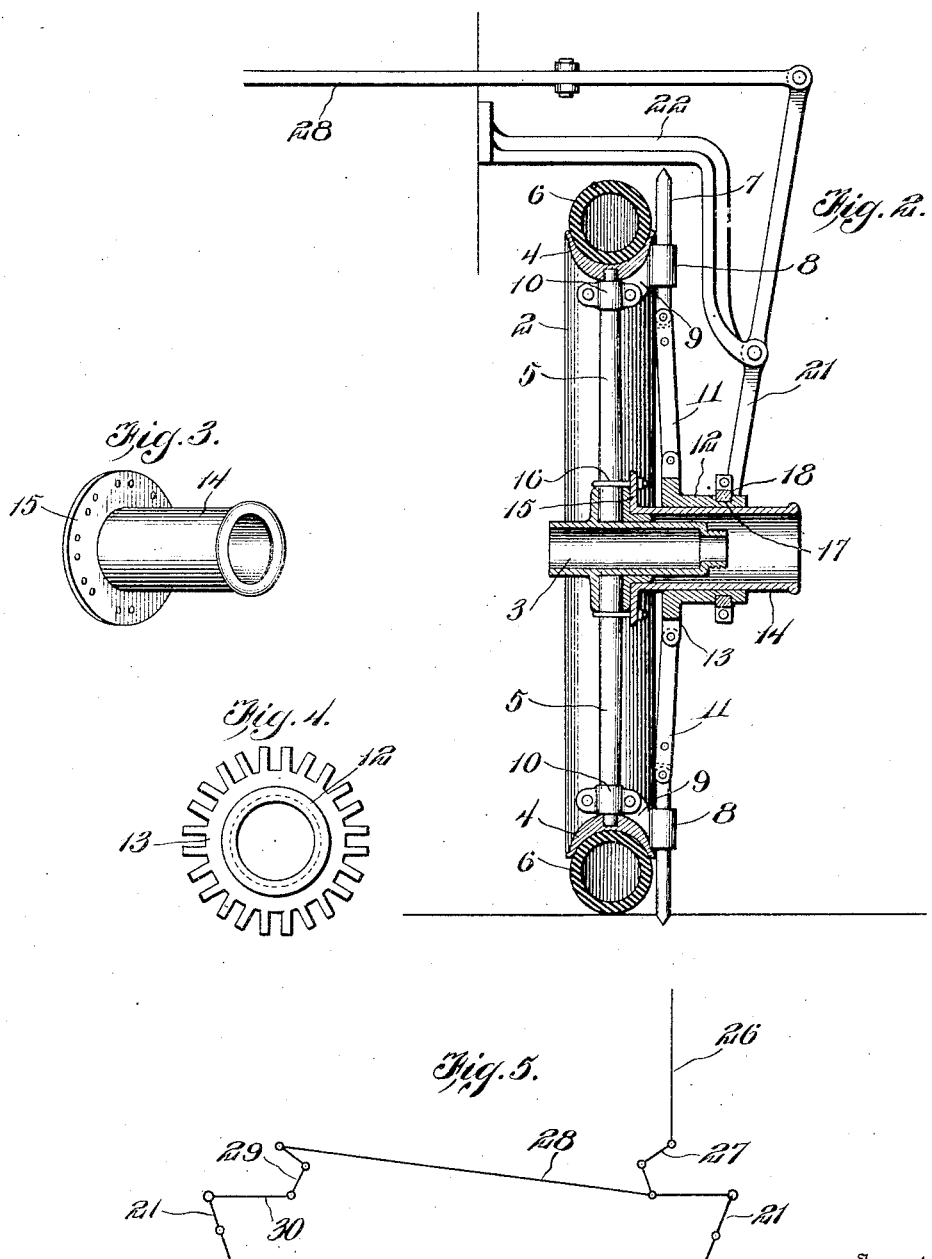

UNITED STATES PATENT OFFICE.

MICHAEL JENSCO, OF BUTLER, PENNSYLVANIA.

ANTISLIPPING-TREAD ATTACHMENT FOR MOTOR-VEHICLES.

941,993.  Specification of Letters Patent.  Patented Nov. 30, 1909.

Application filed November 13, 1908. Serial No. 462,476.

*To all whom it may concern:*

Be it known that I, MICHAEL JENSCO, a citizen of the United States, residing at Butler, in the county of Butler and State of Pennsylvania, have invented new and useful Improvements in Antislipping-Tread Attachments for Motor-Vehicles, of which the following is a specification.

This invention relates to anti-slipping tread attachments for the wheels of motor vehicles, the object in view being to provide a simple, effective and comparatively inexpensive construction of devices of this character which may be applied to the wheels and body of any ordinary motor vehicle and thrown into and out of action at will, so as to be out of the way and not interfere with the resiliency of the tires when not in use, while operating when in use to adapt the wheels to secure a firm grip on the road surface to enable hills to be easily climbed, facilitate traction on sandy roads and prevent slipping or skidding of the wheels on muddy and icy roads.

With these and other objects in view, the invention consists of the features of construction and combination of parts hereinafter fully described and claimed, reference being had to the accompanying drawings, in which:—

Figure 1 is a side elevation of a motor vehicle embodying my invention. Fig. 2 is a vertical section through one of the rear wheels thereof. Fig. 3 is a perspective view of an extension tube fixed to the hub of the wheel. Fig. 4 is a side view of the sliding sleeve. Fig. 5 is a diagram of the operating mechanism.

Referring to the drawings, 1 designates the body of an automobile, and 2 one of the rear drive wheels thereof, which is shown as comprising a hub 3, channeled rim or felly 4, spokes 5 connecting the hub and felly, and a resilient tire 6 fitted upon said rim or felly.

Anti-slipping tread devices embodying my invention are mounted upon each of the drive wheels 2 of the vehicle, each set of tread devices comprising a series of pointed rods or spurs 7 arranged for radial movement at one side of the rim and tire for projection and retraction beyond and within the line of the tread surface of the tire. These sliding tread or gripping spurs are adapted when projected to engage or sink into the surface of the ground or roadway to secure a firm grip of the wheels thereon, to enable hills to be easily climbed and to prevent slipping or skidding of the wheels on muddy or icy roads or streets, as well as to adapt the vehicle to easily travel sandy roads. As shown, the spurs are mounted to slide in guide brackets, each comprising a tube 8 in which the coöperating spur is slidably mounted and a curved arm 9 extending inwardly from the tube and bearing against the side of the rim and secured to the outer end of the adjacent spoke by a clip or fastening 10. The series of spurs are pivotally connected for radial movement by links or radius bars 11 to a sliding sleeve 12 having at its inner end a notched annular flange 13 to which the inner ends of the links are pivoted.

The sleeve 12 is fitted to slide laterally of the wheel upon a tube 14 receiving the outer end of the hub 3 and provided at its inner end with an outwardly extending annular flange 15 bearing against the outer face of the body of the hub and secured at intervals to the inner ends of the spokes 5 by U-bolts, clips or other suitable fastenings 16. It will thus be understood that the tube 14 forms a hub extension for mounting the main operating member or sleeve 12 of the tread mechanism upon the hub of the wheel, and, in practice, the parts referred to are properly constructed to enable them to be applied to an automobile wheel of any ordinary construction, whereby the invention may be mounted for use upon the driving wheels of any automobile of ordinary construction without the necessity of varying the construction of the vehicle in any particular.

The sleeve 12 is formed with an external annular groove receiving a shifting collar 18 which may be constructed of suitably coupled sections and is provided at diametrically opposite sides with pivot pins 19 which are pivotally engaged by the arms of a yoke or fork 20 formed upon the lower end of a shipper lever 21, which lever is intermediately fulcrumed upon the lower end of an angle bracket 22 secured to the side of the body of the machine and overhanging and extending down upon the outside of the wheel 2, said lever being movable in a direction transversely of the vehicle so as to slide the sleeve 12 in and out and thus communicate motion through the links 11 to the tread spurs 7, whereby the latter may be projected and retracted.

The construction of the tread devices mounted upon the driving wheels 2 at the opposite sides of the vehicle is the same in every particular, and in order to enable the same to be simultaneously operated an operating lever 23 is provided at a convenient point for manipulation by the driver or chauffeur and carries a pawl 24 to engage a rack 25 by which it may be secured in adjusted position. This lever is arranged at one side of the machine and is connected by a rod 26 with one of the arms of a bell crank lever 27, the other arm of which is pivotally connected with a transversely movable bar or rod 28, the adjacent end of which is pivoted to the upper end of the shipper lever 21 at the same side of the vehicle to operate the tread devices of the wheel at that side. The bar or rod 28 passes through the body of the vehicle above the plane of the wheels and is connected at its opposite end on the other side of the vehicle to one of the arms of a bell crank lever 29, the other arm of which is connected by a link 30 with the shipper lever 21 at that side. The two bell crank levers 27 and 29 are so mounted and connected with the coupling bar or rod 28 that a movement of said bar in one direction will cause a simultaneous projection of the gripping spurs of both wheels, while a reverse movement of the bar will effect the simultaneous retraction of the gripping spurs of both wheels, as will be readily understood by reference to Fig. 5.

From the foregoing description, the construction and mode of operation of my improved anti-slipping tread or gripping attachments for the wheels of a motor vehicle will be readily understood, and it will be apparent that the invention provides devices of this character which may be applied to the wheels of automobiles of ordinary construction without the necessity of modifying the body or wheels of the vehicle in any material particulars. It will also be seen that the construction of the tread mechanism is simple, so that the invention may be manufactured and applied for use upon a vehicle at a comparatively low cost. When the spurs are projected their pointed ends extend beyond the tread surfaces of the tires to enable a firm grip upon the ground to be obtained. When said spurs are retracted their pointed ends lie inwardly beyond the tread portions of the tires to a sufficient extent to prevent interference with the resiliency of the tires under ordinary conditions of service.

Having thus fully described the invention, what is claimed as new is:—

1. In a motor vehicle, the combination with the vehicle body, and the rear axle thereof, of wheels carried by said axle, guides upon the rim portions of the wheels, sleeves slidably mounted on the hubs of the wheels, gripping spurs radially movable in said guides and operatively connected to said sleeves for projection and retraction by reverse movements thereof, pivoted operating levers connected with the sleeves, reversely arranged bell crank levers connected with said operating levers, a link connecting the bell crank levers, and a main operating connection coupled to one of said bell crank levers.

2. The combination with a vehicle body and one of its wheels, of guides upon the outer side of the rim portion of the wheel, an outward extension upon the hub of the wheel, a collar slidably mounted upon said extension, gripping spurs slidably mounted in said guides, links connecting the collar with the spurs, an angular bracket supported by the body and extending outward therefrom and downward on the outer side of the wheel, a lever pivoted to said bracket and to the collar, and a bell crank for operating said lever.

In testimony whereof I affix my signature in presence of two witnesses.

MICHAEL JENSCO.

Witnesses:
 JACOB KECK,
 OSCAR OERTEL.